E. H. SCHWARZ.
ELECTRIC STARTING AND GENERATING SYSTEM.
APPLICATION FILED MAY 16, 1916.

1,343,409.

Patented June 15, 1920.

Witnesses

Inventor
Elmer H. Schwarz
By Kerr, Page, Cooper & Hayward
Attorneys.

UNITED STATES PATENT OFFICE.

ELMER H. SCHWARZ, OF GLEN ROCK, NEW JERSEY, ASSIGNOR TO THE DAYTON ENGINEERING LABORATORIES COMPANY, A CORPORATION OF OHIO.

ELECTRIC STARTING AND GENERATING SYSTEM.

1,343,409.  Specification of Letters Patent.  Patented June 15, 1920.

Application filed May 16, 1916. Serial No. 97,783.

*To all whom it may concern:*

Be it known that I, ELMER H. SCHWARZ, a citizen of the United States, residing at Glen Rock, county of Bergen, and State of New Jersey, have invented certain new and useful Improvements in Electric Starting and Generating Systems, of which the following is a full, clear, and exact description.

The present invention relates to electric cranking and generating systems for gas engines, and has among its objects to make a novel combination of the field winding arrangements for the dynamo which is constructed to serve as an engine cranking motor.

In the particular form in which the present improvements are embodied, the series field winding is utilized for the cranking operation so as to give a high torque cranking movement. Then for the generating operation, a shunt field winding is utilized, but in order to have a regulation of the generating current, a portion of the series field winding is made use of to oppose the shunt field winding to give the desired regulating effect.

In this manner it will be appreciated that a strong series field may be made use of for the cranking movement; but then for the generating condition, if this strong series field were utilized in opposition, the opposing effect would be too great; therefore, in my improvements I arrange the winding so that only a portion of the series winding is made use of, and thereby economy of parts is secured and proper regulation of the current brought about so as to secure a sufficient charging rate for the proper replenishment of the batteries.

A general type of starting and charging system to which the present improvements are applicable is shown in the patents to Charles F. Kettering, No. 1,150,523, dated August 17th, 1915, and No. 1,171,055, dated February 8th, 1916. But the particular form of dynamo which I have shown in one form or embodiment of my present improvements, is set forth in the application of Charles F. Kettering, Ser. No. 721,237, filed September 19, 1912.

The novel features of my invention will be pointed out in the claims annexed hereto.

Figure 1:
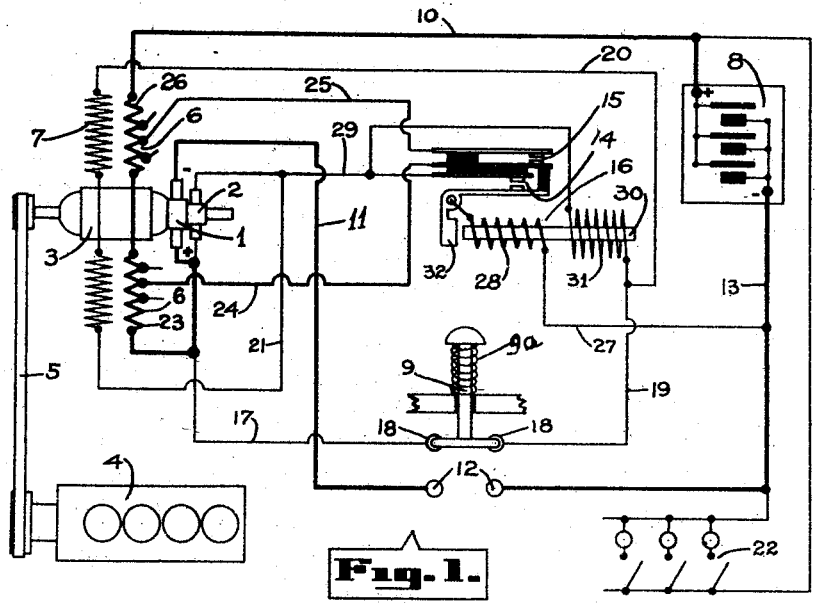
Figure 2:
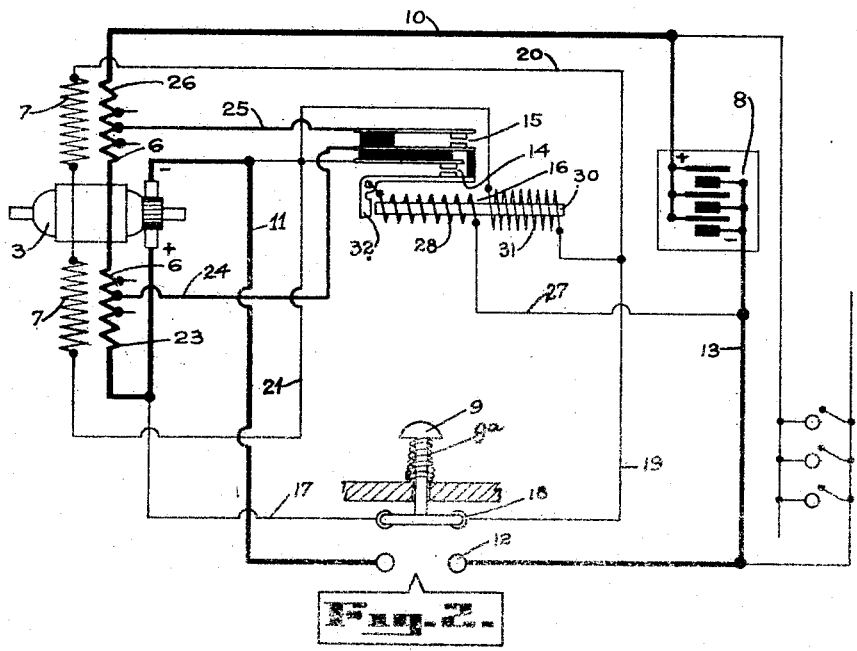

In the accompanying drawings Figure 1 is a wiring diagram of my improved system adapted to the particular form of dynamo which is set forth in the application of Charles F. Kettering, Serial No. 721,237, filed September 19, 1912, aforementioned. Fig. 2 is a similar wiring diagram adapted to the common form of dynamo.

Referring to Fig. 1, the dynamo has two separate armature windings as well as two separate field windings. One of the armature windings, that used during motor operation, is connected to the commutator 1, while the other armature winding, that used for generator operation, is connected to the commutator 2. The armature 3 is mechanically connected to the engine 4 by any suitable means such as the belt 5 or, as is common in devices of this character, it is connected by gears or a set of differential gears, such as are shown in the Kettering patents and application above referred to. The field windings are shown adapted for a two-pole field, the series winding 6 being permanently connected in series with the positive brush of the motor commutator 1 and the shunt winding 7 being normally connected across the brushes of the generator commutator 2. The electrical connections are such that when the starting switch 9 is depressed against the spring 9ª so that the lower contacts are closed and the upper ones broken, current is sent from the positive pole of the battery 8 through the wire 10, through the series field winding 6 to the positive brush of the commutator 1, through the armature winding attached to said commutator to the negative brush of said commutator, through the wire 11, through the lower contacts 12 of the starting switch, and through the wire 13 to the negative pole of the battery. This completes the motor circuit which, as seen, is indicated by the heavy wiring. The dynamo then operates as a motor by the current derived from the storage battery, and the gas engine 4 is started. As soon as the engine runs under its own power, the starting switch 9 is released and the motor circuit is thereby interrupted at the lower switch contacts. The engine now running under its own power drives the dynamo through belt 5 or connecting gearing either at the same ratio of speed as under motor conditions or at a lower ratio as utilized in the above mentioned Kettering patents and application. It will be noted that in its normal position as controlled by the spring 9ª, the starting switch 9 bridges the upper contacts of the switch which normally closes the circuit of the shunt field winding across the commutator 2 of the generator armature winding. Thus, since the armature 3 is driven by the gas engine 4, the generator armature winding begins to "pick up", that is, generates the voltage which when it rises to a predetermined value, which is above that of the voltage of the battery 8, the contacts 14 and 15 controlled by the automatic switch 16 are closed and the generator winding of the armature is thrown directly on the battery 8. The main generating circuit is as follows: From the positive brush of the commutator 2 through section 23 of the lower half of the series field winding 6, through the wire 24 to the contacts 15 of the automatic switch 16, through the wire 25, through the upper section 26 of the upper half of the series field winding 6, through the wire 10 to the positive pole of the battery 8, through said battery to the negative pole, through the wire 13, through the wire 27, through the coarse wire winding 28 on the automatic switch 16, through the contacts 14 of said switch, through the wire 29 to the negative brush of the commutator 2, and through the generator winding connected to said commutator to the positive brush of the same. Thus the battery is connected directly to the generator armature winding through the series field 6, but as will be noted, the current passes through the series field in an opposite direction to what it did when the motor-generator was acting as a motor, since, as is well understood, the current is reversed in direction in charging the battery from what it was in discharge. Also, equal parts of the two sections of the series field winding are short circuited through the contacts 15 of the automatic switch 16, so that the series field is weakened over what it was under motor conditions, that is, the series field winding has fewer effective turns and, consequently, less magnetic effect for a given current than it had under motor conditions. The shunt and series field winding are so wound with respect to each other that under generating conditions the magnetism of the series field opposes that of the shunt field. A number of taps, several of which are shown, may be brought out from the series winding to any corresponding pair of which the wires 24 and 25 might be connected instead of to the points shown, for the purpose of allowing a certain adjustment in the amount of short circuiting of the turns, in order to give more or less opposition effect to the series winding. The automatic switch 16 is of the well known form and consists of an iron core 30 wound with a coarse wire series winding 28 and a fine wire shunt winding 31. The shunt winding 31 is connected directly across the generator armature when the starting switch 9 is in its normal position and the upper contacts 18 are closed. When the voltage reaches the predetermined value as before mentioned, the shunt winding 31 energizes the core 30 and attracts the armature 32 of the switch, closing the contacts 14 and 15. This closes the generating circuit and, consequently, energizes the series winding 28 of the switch which gives assistance to the shunt winding 31 in holding the switch closed. Should the speed of the engine and dynamo be so reduced that the battery voltage is higher than the generator voltage, the main current will be reversed and the series coil 28 of the automatic switch will then oppose the shunt winding 31, so weakening the magnetism in the core 30 as to open the switch contacts 14 and 15. The automatic switch is shown in diagrammatic form and may be of any well known construction. Lamps 22 are connected across the battery 8 through suitable switches.

Referring to Fig. 2, the electrical connections are the same as that of Fig. 1, except for the few changes necessary in applying this system to an armature having one winding and one commutator. All the parts and wires are similarly marked. It will not be necessary to trace the circuits under motor and under generator conditions because the circuits are the same as in Fig. 1, except that the circuit under generator conditions passes through the same armature winding and commutator brushes as under motor conditions instead of through a separate armature winding and commutator.

I do not wish to limit myself to the exact construction herein described and illustrated, as modifications can be made which would not depart from the spirit of my invention. The chief object is to utilize a strong series field when the dynamo is acting as a motor to start the gas engine and to automatically cut out a portion of the series field winding when the dynamo is acting as a generator to charge the storage battery.

What is claimed is as follows:

1. In a starting and generating system for internal-combustion engines, the combination with a dynamo and a battery having circuit connections therewith; of a series field winding for the dynamo; a shunt field winding for the generating circuit; means for utilizing the full series field winding under motor conditions; and means for selecting a portion only of the series field winding for opposing the shunt field winding under generating conditions, said means becoming operative when the dynamo attains a predetermined speed.

2. In a starting and generating system for internal combustion engines, the combination with a dynamo and a battery having circuit connections therewith; of a series field winding for the dynamo; a shunt field winding for the dynamo; means for utilizing the full series field winding under motor conditions; and means for automatically selecting a portion of the turns of said series field winding and opposing them to the shunt field winding under generating conditions, said automatic means becoming operative when the dynamo attains a predetermined speed.

3. In a starting and generating system for internal-combustion engines, the combination with a dynamo and a battery having circuit connections therewith; of a series-field winding for the dynamo; a shunt-field winding for the dynamo; means for utilizing the full series-field winding under motor conditions; and automatic means for connecting the dynamo with the battery and for selecting a portion of the turns of the series-field winding and opposing them to the shunt-field winding, when the voltage of the dynamo current has reached a certain value.

4. In a starting and generating system for internal-combustion engines, the combination with a dynamo and a battery having circuit connections therewith; of a series-field winding for the dynamo; a shunt-field winding for the dynamo; switch devices adapted in one position to bring the full series field winding into operation under motor conditions, and in another position to bring the shunt-field winding into operation for generator conditions; and automatic means for connecting the dynamo with the battery, and for selecting a portion of the turns of the series-field windings and opposing them to the shunt-field winding, when the voltage of the dynamo current has reached a certain value.

5. In a starting and generating system for internal-combustion engines, the combination with a dynamo and a battery having circuit connections therewith; of a series-field winding for the dynamo; a shunt-field winding for the dynamo; devices for cutting out the operation of the series field at the end of the motor operation and for bringing into operation the shunt field at the beginning of the generating operation; and automatic means acting subsequently to select a portion of the series-field windings during the generating operation.

6. In a starting and generating system for internal-combustion engines, the combination with a dynamo and a battery having circuit connections therewith; of a series-field winding for the dynamo; a shunt-field winding for the dynamo; switch devices adapted in one position to bring the full series-winding into operation under motor conditions, and, in another position to bring the shunt-field winding into operation for generator conditions, while preventing the passage of current to any part of the series-field winding during the initial generator operation; and automatic devices for connecting the dynamo with the battery and for selecting a portion of the turns of the series-field winding and opposing them to the shunt-field winding during the generating operation.

7. In a starting and generating system for internal-combustion engines, the combination with a dynamo having series and shunt field windings and operable as a motor to start the engine or as a generator driven by the engine; of a storage battery; a manually operable switch movable into one position to connect the battery with the dynamo and to render operative the series field winding, and in another position to render the series field winding inoperative and to render the shunt field winding operative; and means automatically operable at a predetermined dynamo speed to connect the dynamo with the battery and to render operative a portion of the series field for opposing the shunt field.

8. In a starting and generating system for internal-combustion engines, the combination with a dynamo having series and shunt field windings and operable as a motor to start the engine or as a generator driven by the engine; of a storage battery; an automatic circuit controller including a magnet winding normally connected with the dynamo, and contacts coöperating when actuated by said magnet to close the circuit between the battery and dynamo and to short circuit a portion of the series field; and a switch normally connecting the shunt field and magnet winding with the dynamo armature, but movable manually into position to connect the battery with the dynamo and to render the series winding operative and to disconnect the magnet winding and shunt field-winding from the dynamo.

In testimony whereof I hereunto affix my signature.

ELMER H. SCHWARZ.